(12) United States Patent
Giovannini et al.

(10) Patent No.: US 7,992,665 B2
(45) Date of Patent: Aug. 9, 2011

(54) HOOD ASSEMBLY FOR A MACHINE AND A METHOD OF USE THEREOF

(75) Inventors: Mario Giovannini, Plainfield, IL (US); Rahul S. Visal, Hanover Park, IL (US); Gerald W. Gavin, Hinckley, IL (US); Daniel A. Hatfield, Rochelle, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 12/901,753

(22) Filed: Oct. 11, 2010

(65) Prior Publication Data

US 2011/0024213 A1    Feb. 3, 2011

Related U.S. Application Data

(62) Division of application No. 11/481,096, filed on Jul. 5, 2006, now abandoned.

(51) Int. Cl.
*B62D 25/10* (2006.01)

(52) U.S. Cl. .................. 180/69.2; 296/100.09

(58) Field of Classification Search .......... 180/68.1, 180/68.2, 68.4, 69.2, 69.21, 69.24; 165/149; 16/235, 241, 242, 243, 246, 254; 296/100.09, 296/100.1, 193.11
See application file for complete search history.

(56) References Cited

U.S. PATENT DOCUMENTS

| | | | |
|---|---|---|---|
| 348,245 A | 8/1886 | Soevyn | |
| 1,343,519 A | 6/1920 | Motte | |
| 1,534,903 A * | 4/1925 | Bouchard | 165/134.1 |
| 1,981,093 A | 11/1934 | Conarroe | |
| 2,132,926 A | 10/1938 | Best | |
| 2,218,384 A | 10/1940 | Hjehn | |
| 2,582,839 A * | 1/1952 | Lippard et al. | 280/847 |
| 2,699,223 A | 1/1955 | Brumbaugh | |
| 2,925,874 A | 2/1960 | Norrie | |
| 3,583,513 A | 6/1971 | Macadam | |
| 3,743,045 A | 7/1973 | Hansen | |
| 3,765,500 A | 10/1973 | Reeves | |
| 3,982,600 A | 9/1976 | Gerresheim et al. | |
| 4,037,682 A * | 7/1977 | Sandrock et al. | 180/69.2 |
| 4,071,009 A * | 1/1978 | Kraina | 123/198 E |
| 4,131,172 A | 12/1978 | Wolfgram | |
| 4,137,983 A | 2/1979 | Gray | |

(Continued)

FOREIGN PATENT DOCUMENTS

EP    0846612    12/2003

OTHER PUBLICATIONS

Unknown, Photo of Volvo L110E taken before patent application filed, date unknown, 1 page, unpublished, Location unknown, Jul. 1, 2006.

(Continued)

*Primary Examiner* — J. Allen Shriver, II
*Assistant Examiner* — Brodie Follman
(74) *Attorney, Agent, or Firm* — Finnegan, Henderson, Farabow, Garrett & Dunner LLP

(57) ABSTRACT

A hood assembly includes a first hood and a second hood. The second hood is selectively rotatable with respect to the first hood to provide rapid access to components enclosed by the second hood, such as a radiator. The first and second hoods are selectively rotatable together to provide access to components enclosed by the first and second hoods, such as an engine.

16 Claims, 2 Drawing Sheets

U.S. PATENT DOCUMENTS

| | | | |
|---|---|---|---|
| 4,230,309 A | 10/1980 | Schnitzius | |
| 4,287,961 A * | 9/1981 | Steiger | 180/68.4 |
| 4,319,653 A * | 3/1982 | Carlson | 180/89.17 |
| 4,378,945 A | 4/1983 | Trautman | |
| 4,437,529 A | 3/1984 | Fralish | |
| 4,511,175 A | 4/1985 | Gellenbeck | |
| 4,669,563 A | 6/1987 | Kerney | |
| 4,771,844 A | 9/1988 | Bassett | |
| 4,835,951 A | 6/1989 | Walker | |
| 4,889,203 A | 12/1989 | Hagarty | |
| 4,921,062 A | 5/1990 | Marlowe | |
| 4,972,913 A | 11/1990 | Ray et al. | |
| 5,199,521 A * | 4/1993 | Samejima et al. | 180/68.1 |
| 5,228,530 A * | 7/1993 | Tsuchihashi | 180/68.4 |
| 5,634,525 A | 6/1997 | Templeton et al. | |
| 5,645,134 A * | 7/1997 | Frankel et al. | 180/69.24 |
| 5,651,164 A | 7/1997 | DeMarco | |
| 5,671,820 A | 9/1997 | Kobayashi et al. | |
| 5,725,065 A | 3/1998 | Knurr et al. | |
| 5,738,179 A * | 4/1998 | Matsui | 180/69.21 |
| 5,749,425 A | 5/1998 | Cudden | |
| 6,053,486 A | 4/2000 | Schuitema et al. | |
| 6,092,818 A | 7/2000 | Shute | |
| 6,116,366 A * | 9/2000 | Creswick et al. | 180/69.2 |
| 6,202,979 B1 | 3/2001 | Wolfgang et al. | |
| 6,374,936 B1 * | 4/2002 | Smith | 180/89.17 |
| 6,435,264 B1 * | 8/2002 | Konno et al. | 165/41 |
| 6,457,543 B1 * | 10/2002 | Wooldridge | 180/68.4 |
| 6,508,323 B2 | 1/2003 | Burgo | |
| 6,615,942 B2 | 9/2003 | Shinohara et al. | |
| 6,626,256 B2 | 9/2003 | Dennison et al. | |
| 6,634,449 B2 | 10/2003 | Randolph | |
| 6,655,486 B2 * | 12/2003 | Oshikawa et al. | 180/68.1 |
| 6,663,170 B1 | 12/2003 | Miga | |
| 6,810,979 B2 * | 11/2004 | Johansson et al. | 180/69.21 |
| 7,096,987 B2 * | 8/2006 | Moen et al. | 180/69.2 |
| 7,128,178 B1 * | 10/2006 | Heinle et al. | 180/68.4 |
| 7,131,684 B1 | 11/2006 | Gooding | |
| 7,134,518 B2 * | 11/2006 | Arai et al. | 180/68.1 |
| 7,255,189 B2 * | 8/2007 | Kurtz et al. | 180/68.4 |
| 7,401,672 B2 * | 7/2008 | Kurtz et al. | 180/68.4 |
| 7,458,434 B2 * | 12/2008 | Samejima et al. | 180/68.1 |
| 7,673,716 B2 * | 3/2010 | Moen et al. | 180/69.2 |
| 7,828,097 B2 * | 11/2010 | Kondou et al. | 180/68.1 |
| 2001/0004949 A1 | 6/2001 | Burgo | |
| 2001/0027884 A1 | 10/2001 | Dennison et al. | |
| 2002/0017408 A1 * | 2/2002 | Oshikawa et al. | 180/69.2 |
| 2004/0173395 A1 * | 9/2004 | Arai et al. | 180/68.1 |
| 2004/0216934 A1 | 11/2004 | Tomiyama et al. | |
| 2005/0006156 A1 | 1/2005 | Schambach | |
| 2005/0279549 A1 * | 12/2005 | Kurtz et al. | 180/69.2 |
| 2006/0016632 A1 | 1/2006 | Samejima et al. | |
| 2006/0070832 A1 | 4/2006 | Adoline et al. | |
| 2006/0086551 A1 | 4/2006 | Cleland et al. | |
| 2007/0169976 A1 | 7/2007 | Bigsby et al. | |
| 2007/0289790 A1 * | 12/2007 | Moen et al. | 180/69.2 |
| 2008/0006460 A1 * | 1/2008 | Giovannini et al. | 180/69.2 |
| 2009/0020349 A1 * | 1/2009 | Renard | 180/69.2 |
| 2009/0095441 A1 * | 4/2009 | Masunoya et al. | 165/41 |

OTHER PUBLICATIONS

Unknown, Photo of Volvo L120E taken before patent application filed, date unknown, 1 page, unpublished, Location unknown, Jul. 1, 2006.

Unknown, Photo of Volvo L180E taken before patent application filed, date unknown, 1 page, unpublished, Location unknown, Jul. 1, 2006.

Unknown, Photo of Case 621 D taken before patent application filed, date unknown, 1 page, unpublished, Location unknown, Jul. 1, 2006.

Unknown, Photo of Case 721 D taken before patent application filed, date unknown, 1 page, unpublished, Location unknown, Jul. 1, 2006.

Unknown, Photo of Fiat W270 taken before patent application filed, date unknown, 1 page, unpublished, Location unknown, Jul. 1, 2006.

Unknown, Photo of Liebherr 564 taken before patent application filed, date unknown, 1 page, unpublished, Location unknown, Jul. 1, 2006.

Unknown, Photos of Komatsu WA 380-5 and WA 480-5 taken before patent application filed, date unknown, 1 page, unpublished, Location unknown, Jul. 1, 2006.

Unknown, Photo of JCB 426 taken before patent application filed, date unknown, 1 page, unpublished, Location unknown, Jul. 1, 2006.

Unknown, Photo of Deere 844J taken before patent application filed, date unknown, 1 page, unpublished, Location unknown, Jul. 1, 2006.

Volvo Inc., Advertising Brochure for Volvo L220E published before patent application filed, date unknown, 20 pages, published by Volvo, location unknown, Jul. 1, 2006.

* cited by examiner

HOOD ASSEMBLY FOR A MACHINE AND A METHOD OF USE THEREOF

RELATION TO OTHER PATENT APPLICATION

This application is a divisional of application Ser. No. 11/481,096, filed Jul. 5, 2006 with the same title.

TECHNICAL FIELD

This disclosure relates to hood assemblies, and more particularly to a hood assembly that includes a first hood that is selectively moveable with respect to a second hood.

BACKGROUND

Mobile machines, such as off highway trucks, excavators, tractors, motor graders, wheel loaders, scrapers and the like often operate in an environment characterized by airborne debris, including particles such as dust. The airborne debris is directed by the cooling fan of the machine through the radiator. The debris collects on the radiator and, over time, restricts air flow through the radiator and thus reduces the efficacy of the radiator.

Therefore, the operator must manually clean the radiator to prevent excessive accumulation of debris. Cleaning the radiator typically involves spraying a fluid such as water into a first side of the radiator that faces the engine and a second side opposite the first.

To access the radiator for cleaning in some prior art machines, the operator must raise an engine hood to its open position. If the hood is a large one which covers the engine and the radiator, opening the hood frequently to clean the radiator can be cumbersome and time-consuming. A machine with a very large hood may require a powered actuator to open the hood. Opening a hood with a powered actuator can be especially time consuming. In some instances, radiator cleaning can be further compounded since tilting the hood to an open position can sometimes only give good access to one side of the radiator.

In some prior art machines, a radiator grill is pivotable about a vertical axis to provide access to the second side of the radiator, i.e., the side of the radiator that faces away from the engine. Accordingly, to clean the radiator, first the entire engine hood is raised to spray the first side of the radiator, then the hood is lowered and the radiator grill is pivoted to clear debris from the second side of the radiator. If debris inadvertently re-enters the radiator when the second side of the radiator is being cleared, then the entire hood must be raised again to repeat the step of spraying the first side of the radiator. Thus in some instances, a pivoting grill provides access only to the second side, and the first side is only accessible by raising the hood, but both procedures need to be done in order to thoroughly clean the radiator. These respective events may be further complicated in some instances since the radiator may only be pivoted when the hood is lowered.

Some prior art vehicles include small access panels that allow rapid access to limited parts of the engine and radiator. For example, Best discloses an access panel in U.S. Pat. No. 2,132,926 that provides access to a water fill tube and an oil fill tube in an automobile. Hansen discloses an access panel in U.S. Pat. No. 3,743,045 that provides access to the side of a radiator that faces away from an engine. However, the access panels disclosed by Best and Hansen do not provide rapid access to all parts of a radiator necessary to clean the radiator of debris.

The present disclosure is directed to one or more of the problems set forth above.

SUMMARY OF THE DISCLOSURE

A hood assembly is provided that includes a first hood and a second hood. A first hinge defines a first axis and operatively interconnects the first hood and the second hood such that the second hood is selectively rotatable with respect to the first hood about the first axis. The hood assembly further includes at least part of a second hinge that defines a second axis that is substantially parallel to the first axis. The at least part of a second hinge is operatively connected to the first hood such that the first and second hoods are selectively rotatable together about the second axis.

A machine includes a chassis, an engine, a radiator, and a hood assembly. The hood assembly has an engine hood that is moveably mounted with respect to the chassis, and a radiator hood that is moveably mounted with respect to the chassis. The hood assembly is characterized by three configurations including a fully closed configuration, a fully open configuration, and a radiator hood open configuration. The radiator hood twice intersects a transversely oriented line passing between the engine and the radiator in at least one of the three configurations and does not intersect the line in at least one other of the three configurations.

A method of configuring a machine includes moving a hood assembly from a fully closed configuration to a fully open configuration by rotating an engine hood and a radiator hood together about a first axis. The method further includes moving the hood assembly from the fully closed configuration to a radiator hood open configuration by rotating the radiator hood with respect to the engine hood about a second axis that is substantially parallel to the first axis.

DETAILED DESCRIPTION

Figure 1:
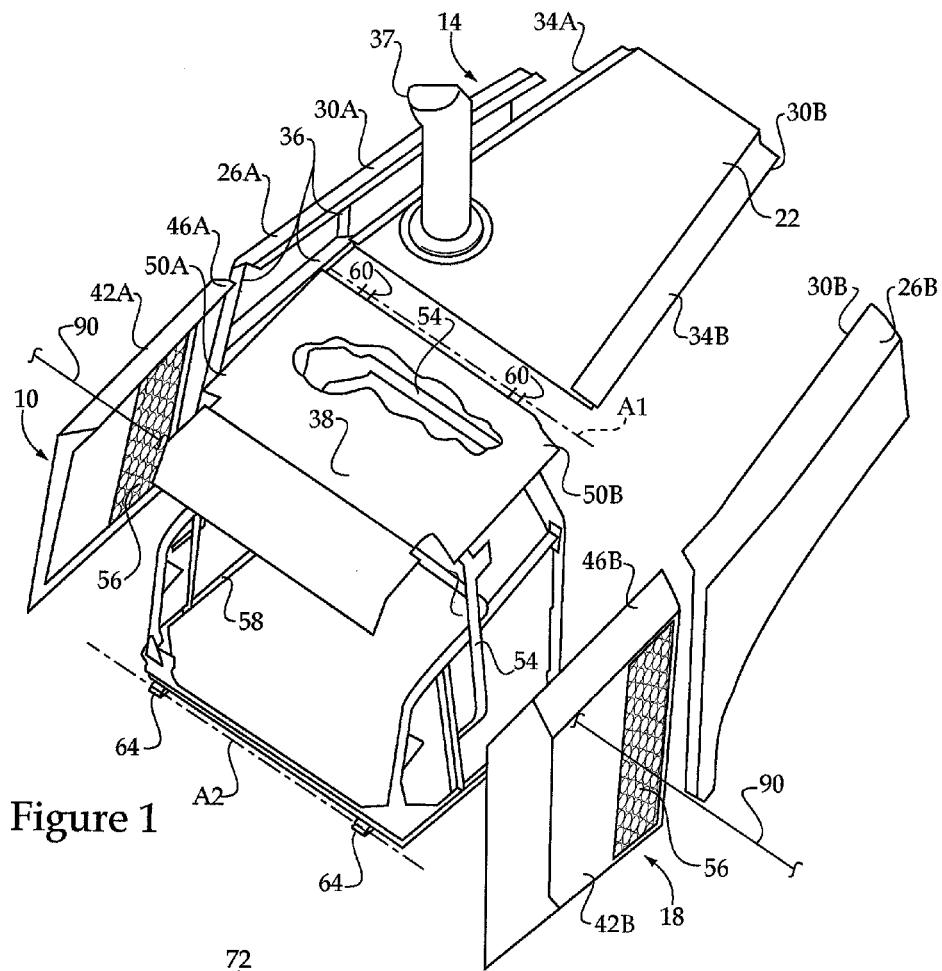
FIG. 1 is a schematic, perspective, exploded view of a hood assembly including a radiator hood and an engine hood.

Referring to FIG. 1, a hood assembly 10 is schematically depicted. The hood assembly includes a first hood 14, which is also referred to herein as an "engine hood," and a second hood 18, which is also referred to herein as a "radiator hood." The engine hood 14 includes a top panel 22 and two sidewall panels 26A, 26B. Sidewall panel 26A is connected to the top panel 22 so that the top edge 30A of the sidewall panel 26A abuts a lateral edge 34A of the top panel 22. Similarly, sidewall panel 26B is connected to the top panel 22 so that the top edge 30B of the sidewall panel 26B abuts another lateral edge 34B of the top panel 22. The top panel 22 is generally horizontally oriented, and the two sidewall panels 26A, 26B depend downwardly therefrom so that the engine hood 14 is characterized by an inverted U-shaped cross section. Accordingly, the panels 22, 26A, 26B cooperate to define a cavity (shown at 35 in FIG. 2) therebetween that is downwardly open. In the embodiment depicted, the engine hood 14 includes structural members 36 mounted to the panels 22, 26A, 26B. An exhaust stack 37 is mounted to the top panel 22.

The radiator hood 18 includes a top panel 38 and two sidewall panels 42A, 42B. Sidewall panel 42A is connected to the top panel 38 so that the top edge 46A of the sidewall panel 42A abuts a lateral edge 50A of the top panel 38. Similarly, sidewall panel 42B is connected to the top panel 38 so that the top edge 46B of the sidewall panel 42B abuts another lateral edge 50B of the top panel 38. The top panel 38 is generally horizontally oriented, and the two sidewall panels 42A, 42B depend downwardly therefrom so that the radiator hood 18 is characterized by an inverted U-shaped cross section. Accordingly, the panels 38, 42A, 42B cooperate to define a cavity (shown at 51 in FIG. 2) therebetween that is downwardly open. A radiator grill (shown at 52 in FIG. 5) is connected to the top panel 38 and the sidewall panels 42A, 42B. In the embodiment depicted, the radiator hood 18 includes structural reinforcement members 54 mounted to the panels 38, 42A, 42B. Each of panels 42A and 42B defines a plurality of optional ventilation holes 56. If desired, panel 38, may also include ventilation holes.

The hood assembly 10 includes a frame 58. The engine hood 14 is mounted with respect to the frame or support structure 58 such as by mechanical fasteners (not shown). Two hinges 60 define a first axis A1. Hinges 60 connect top panel 38, and therefore connect the radiator hood 18, to the frame 58 such that the radiator hood 18 is selectively rotatable with respect to the engine hood 14 and the frame 58 about axis A1. Two hinges 64 define a second axis A2 and are mounted to the frame 58 such that the frame 58, the engine hood 14, and the radiator hood 18 are selectively rotatable together about axis A2. The hinges 60, 64 are arranged such that axis A1 and axis A2 are substantially parallel to one another.

Figure 2:
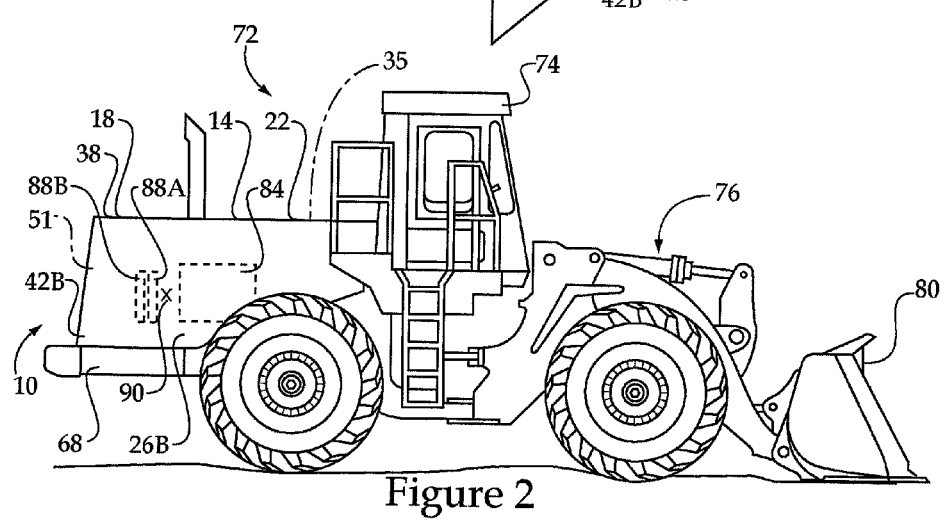
FIG. 2 is a schematic side view of a machine including the hood assembly of FIG. 1 in a fully closed configuration.

Referring to FIGS. 1 and 2, the hinges 64 operatively connect the hood assembly 10 to the chassis 68 of a machine 72, which, in the embodiment depicted, is a wheel loader. However, those skilled in the art will recognize other machines, such as off highway trucks, excavators, tractors, motor graders, wheel loaders, scrapers, etc., that may be used with the hood assembly 10. The wheel loader 72 includes an operator cab 74, and a work implement 76 having a bucket 80 attached for digging and loading. The work implement 76 is preferably powered and controlled by hydraulic systems (not shown) as is well known in the art. The wheel loader 72 also includes an engine 84 and two radiators 88A, 88B mounted with respect to the chassis 68 rearward of the operator cab 74. The radiators 88A, 88B are arranged parallel to, and spaced apart from, one another.

The hood assembly 10 is selectively moveable between at least three configurations, including a fully closed configuration, a fully open configuration, and a radiator hood open configuration. The hood assembly 10 is depicted in the fully closed configuration in FIG. 2. The engine hood 14 is positioned with respect to the chassis 68 such that the top panel 38 of the engine hood 14 is horizontally oriented and covers the engine 84. The engine 84 is at least partially within the cavity 35 formed by the top panel 38 and the sidewall panels 26A, 26B.

The radiator hood 18 is positioned with respect to the chassis 68 and the engine hood 14 such that the top panel 38 of the radiator hood 18 is horizontally oriented and covers the radiators 88A, 88B. The radiators 88A, 88B are at least partially within the cavity 51 formed by the top panel 38 and the sidewall panels 42A, 42B. A line 90 extending transversely with respect to machine 72 passes between the engine 84 and the radiators 88A, 88B. When the hood assembly 10 is in the fully closed configuration, the radiator hood 18 twice intersects the line 90, namely, at panel 42A and panel 42B. In the context of the present disclosure, a radiator hood "intersects" a line if the line extends through a solid portion of the radiator hood or if the line extends through a hole or aperture defined by the radiator hood, such as the holes shown at 56 in FIG. 1. In the embodiment depicted, each of panels 42A, 42B abuts a respective one of panels 26A, 26B when the hood assembly 10 is in the fully closed configuration.

Figure 3:
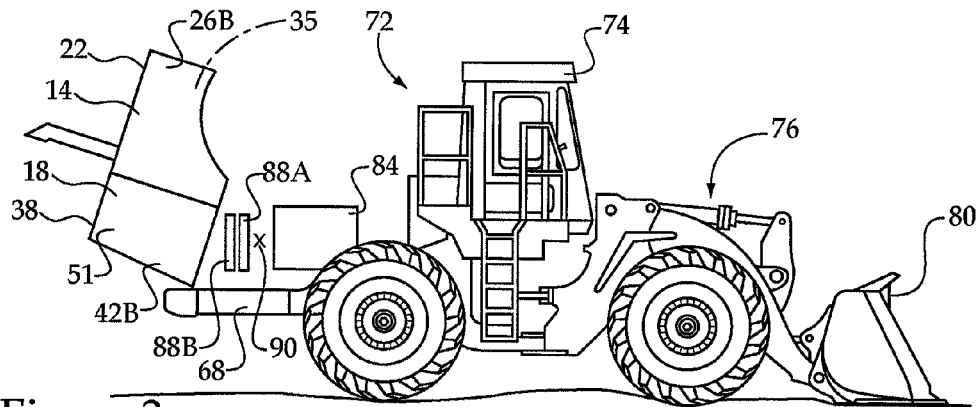
FIG. 3 is a schematic side view of the machine of FIG. 2 with the hood assembly in a fully open configuration.

The hood assembly 10 is rotatable as a unit about axis A2 from the fully closed configuration to the fully open configuration, as shown in FIG. 3. That is, to move the hood assembly 10 from the fully closed configuration to the fully open configuration, the engine hood 14, radiator hood 18, and frame 58 are rotated together as a unit about axis A2. Referring to FIG. 3, wherein like reference numbers refer to like components from FIGS. 1 and 2, when the hood assembly 10 is in the fully open position, portions of the engine 84 and the radiators 88A, 88B that are within the cavities 35, 51 when the hood assembly 10 is in the fully closed configuration are not within the cavities 35, 51, thereby providing access to both the engine 84 and the radiators 88A, 88B.

Referring again to FIG. 2, the radiator hood 18 is shown in a closed position with respect to the engine hood 14. The hood assembly 10 is moveable from the fully closed configuration to the radiator hood open position, as shown in FIG. 4, by rotating the radiator hood 18 about axis A1 from its closed position with respect to the engine hood 14 to an open position with respect to the engine hood 14, as shown in FIG. 4.

Figure 4:
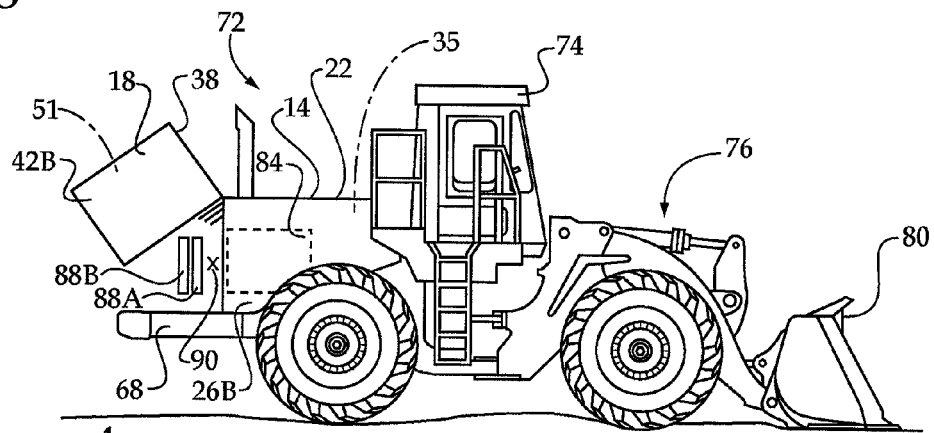
FIG. 4 is a schematic side view of the machine of FIGS. 2 and 3 with the hood assembly in a radiator hood open configuration.

Referring to FIG. 4, the engine hood 14 is in the same position with respect to the chassis 68 as in the fully closed configuration shown in FIG. 2. The radiator hood 18 is positioned so that portions of the radiators 88A, 88B that are within the cavity 51 when the hood assembly is in the fully closed configuration are not within the cavity 51 in the radiator hood open configuration, thereby providing access to the radiators 88A, 88B without having to move the engine hood 14. The radiator hood 18 does not intersect the line 90 when it is in its respective open position, i.e., when the hood assembly 10 is in the radiator hood open configuration. It should be noted that the hood assembly 10 is preferably configured such that, if the engine hood 14 and the radiator hood 18 are rotated together about axis A2 when the radiator hood 18 is in the open position with respect to the engine hood 14, as shown in FIG. 4, sufficient clearance exists between the radiator hood 18 and other components to prevent physical part interference therebetween.

Figure 5:
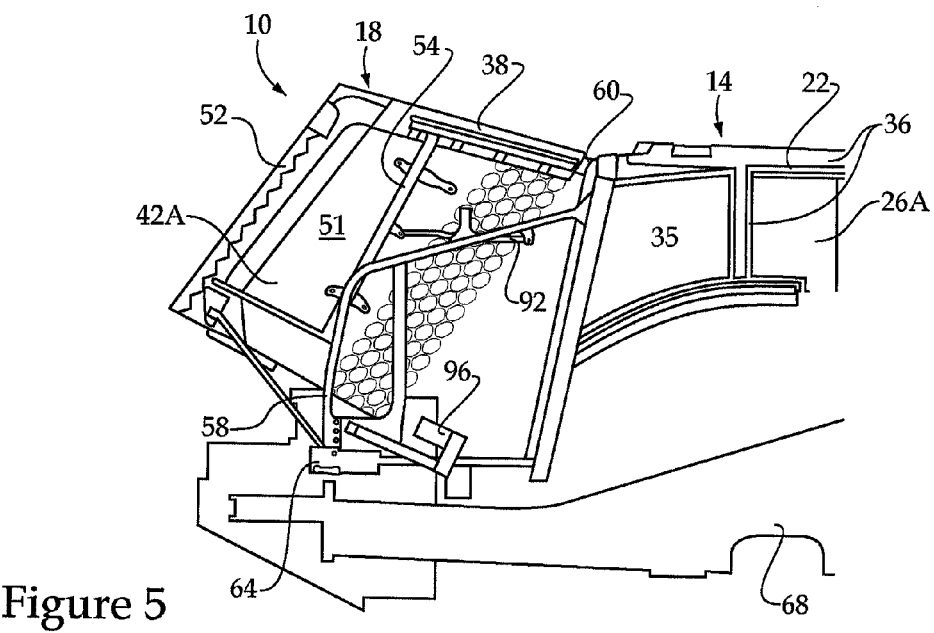
FIG. 5 is a schematic sectional view of the radiator hood of FIGS. 1-4 in a bias neutral position.

Referring to FIG. 5, the hood assembly 10 further includes at least one load assist mechanism, which, in the embodiment depicted, is a gas strut 92. The gas strut 92 interconnects reinforcement member 54 of the radiator hood 18 and the frame 58. The radiator hood 18 is depicted in a bias neutral position in FIG. 5, which is between the radiator hood's open and closed positions. The gas strut 92 is sufficiently configured and positioned to bias the radiator hood 18 toward the closed position when the radiator hood 18 is between its closed position and the bias neutral position, and to bias the radiator hood 18 toward the open position when the radiator hood 18 is between the bias neutral position and the open position.

A latch (not shown) is preferably connected to one of the radiator hood 18 and the frame 58 adjacent hinges 64, and a striker (not shown) is preferable connected to the other of the radiator hood 18 and the frame 58. The striker is selectively engageable with the latch to maintain the radiator hood 18 in its closed position with respect to the engine hood 14, and is selectively releasable to enable movement of the radiator hood from its closed position to its open position. The radiator hood 18 may also include a handle (not shown) at or near the lower edge of the radiator grill 52 to facilitate manual movement of the radiator hood 18 by an operator.

An actuator, such as a servomotor 96, is operatively connected to the frame 58 to selectively rotate the frame, and correspondingly, the radiator hood and the engine hood, about axis A2.

INDUSTRIAL APPLICABILITY

When the hood assembly 10 is in the fully closed configuration as shown in FIG. 2, the engine 84 and the radiators 88A, 88B are substantially enclosed to protect the engine and the radiators from the environment and to provide improved machine aesthetics. To gain access to the engine and the radiators, a machine operator rotates the engine hood 14 and the radiator hood 18 together about axis A2 so that the hood assembly 10 is in the fully open configuration, as shown in FIG. 3. Thus, access to both the engine 84 and the radiators 88A, 88B is achievable through only a single action, namely, rotating the engine hood 14 and the radiator hood 18 together about the second axis A2. Rotating the engine hood 14 and the radiator hood 18 together about the second axis A2 is accomplished in the preferred embodiment by activating the actuator 96.

When access to only the radiators 88A, 88B is desired, such as for clearing debris therefrom, a machine operator need only rotate the radiator hood 18 from its closed position to its open position about the first axis A1, so that the hood assembly 10 is in the radiator hood open configuration as shown in FIG. 4. Thus, the hood assembly 10 eliminates the need to rotate a large hood that covers both the engine 84 and the radiators 88A, 88B merely to clean the radiators, as found in the prior art. In other words, the configuration provided by the hood assembly of the present disclosure facilitates access to both sides of the radiator, and thus eliminates any need to raise and lower a hood in order to accomplish a thorough radiator cleaning.

Furthermore, the radiator hood 18 in the preferred embodiment is manually moveable to its open position, and accordingly, a machine operator need not wait for the actuator 96 to move the engine hood merely to clean the radiators. Thus, the hood assembly 10 reduces the time required to clean the radiators compared to the prior art, resulting in reduced time required for maintenance and, correspondingly, increased machine productivity.

Referring to FIG. 2, an operator opens the radiator hood 18 in the preferred embodiment by releasing the latch (not shown). The gas strut (shown at 92 in FIG. 5) biases the radiator hood 18 in its closed position when the radiator hood 18 is between the closed position and the bias neutral position to prevent the radiator hood 18 from inadvertently opening in the unlikely event the latch does not fully engage the striker, and to assist the machine operator in moving the radiator hood from its open position to its closed position. Accordingly, after releasing the latch, a machine operator must exert sufficient force on the radiator hood 18 in opposition to the gas strut to move the radiator hood 18 past the bias neutral position to an intermediate position so that the gas strut 92 will urge the radiator hood 18 to its open position.

Referring to FIG. 4, when the hood assembly 10 is in the radiator hood open configuration, the side of each of the radiators 88A, 88B that faces the engine 84 is exposed and accessible from both sides of the machine 72. Furthermore, the side of each of the radiators 88A, 88B that faces away from the engine is also accessible. Thus, a machine operator can clean radiator 88A by spraying water or other fluid through the side of radiator 88A that faces the engine 84 to flush debris from radiator 88A out the side of the radiator 88A that faces away from the engine 84. The machine operator then manually clears the flushed debris from side of radiator 88A that faces away from the engine 84. This process is then repeated for each of radiators 88B and any others that may be present. It should be noted that panels or seals may enclose the space between the radiators 88A, 88B. The panels or seals, if present, are opened or removed by the operator prior to beginning the cleaning operation. Those skilled in the art will recognize that one or more of the radiators 88A, 88B may be selectively pivotable about an axis to facilitate access the radiator.

In the event that debris unintentionally reenters any one of the radiators 88A, 88B when manually clearing flushed debris from one of the radiator sides that faces away from the engine, the operator can again spray from the side of the radiator that faces the engine without having to repeatedly open and close the engine hood, as found in the prior art.

It should be understood that the above description is intended for illustrative purposes only, and is not intended to limit the scope of the present invention in any way. Thus, those skilled in the art will appreciate that other aspects, objects, and advantages of the invention can be obtained from a study of the drawings, the disclosure and the appended claims. For example, although the machine of the embodiment disclosed includes three radiators, a machine may include one or more radiators. Further, the first and second axes need not be substantially parallel to one another to achieve three hood assembly configurations wherein the radiator hood twice intersects a line in one of the configurations and does not intersect the line in one other of the configurations. Moreover, movement of the radiator hood need not be by rotation to move between the three configurations.

What is claimed is:

1. A machine comprising:
    a chassis;
    an operator cab;
    an engine;
    a radiator;
    a hood assembly including an engine hood being moveably mounted with respect to the chassis, and a radiator hood being moveably mounted with respect to the chassis, said hood assembly being characterized by three configurations including a fully closed configuration, a fully open configuration, and a radiator hood open configuration;
    wherein said radiator hood twice intersects a transversely oriented line passing between the engine and the radiator in at least one of the three configurations and does not intersect the line in at least one other of the three configurations; wherein the radiator hood opens in one direction into the radiator hood open configuration and the radiator hood and engine hood open together in the opposite direction into the fully open configuration; and wherein
    the engine and the radiator are rearward of the operator cab.

2. The machine of claim 1, further comprising a first hinge operatively connecting the engine hood and the radiator hood to the chassis and about which the engine hood and radiator hood are selectively rotatable together with respect to the chassis and the operator cab.

3. The machine of claim 2, further comprising a second hinge located forward of the radiator, and operatively connecting the radiator hood to the engine hood and about which the radiator hood is selectively rotatable with respect to the engine hood.

4. The machine of claim 3, wherein the first hinge defines a first axis of rotation about which the radiator hood and the engine hood are selectively rotatable; wherein the second hinge defines a second axis of rotation about which the radiator hood is selectively rotatable; and wherein the first axis and the second axis are substantially parallel to one another.

5. The machine of claim 4, wherein each of the engine hood and the radiator hood is characterized by an inverted U-shaped cross section.

6. The machine of claim 5, further comprising at least one load assist mechanism operatively connected to the radiator hood to selectively urge the radiator hood to rotate about the second axis.

7. The machine of claim 6, further comprising an actuator operatively connected to the engine hood and the radiator hood and configured to selectively rotate the engine hood and the radiator hood together about the first axis.

8. The machine of claim 7, wherein the radiator hood is selectively rotatable about the second axis between a closed position with respect to the engine hood, an open position with respect to the engine hood, and a predetermined bias neutral position that is between the open and closed positions; and wherein said at least one load assist mechanism is sufficiently positioned with respect to the radiator hood to bias the radiator hood toward the closed position when the radiator hood is between the closed position and the bias neutral position, and to bias the radiator hood toward the open position when the radiator hood is between the bias neutral position and the open position.

9. The machine of claim 8, wherein the hood assembly further includes a frame mounted with respect to the engine hood; wherein the first hinge operatively connects the frame to the chassis; and wherein the second hinge operatively connects the radiator hood to the frame.

10. The machine of claim 3 wherein the first hinge is located rearward of the radiator, the engine and the operator cab.

11. The machine of claim 10 wherein the chassis is a wheel loader chassis; and an implement bucket attached forward of the operator cab.

12. The machine of claim 5 wherein the radiator hood includes a top panel and two side panels that each defines a plurality of holes therethrough.

13. A wheel loader machine comprising:
a chassis;
an operator cab mounted on the chassis;
an engine mounted on the chassis rearward of the operator cab;
a radiator positioned rearward of the engine;
a first hood;
a second hood;
a first hinge defining a first axis and operatively interconnecting the first hood and the second hood such that the second hood is selectively rotatable with respect to the first hood about the first axis; at least
part of a second hinge defining a second axis that is substantially parallel to the first axis such that the first and second hoods are selectively rotatable together about the second axis with respect to the engine, the radiator and the operator cab; and wherein the second hood twice intersects a transversely oriented line passing between the engine and the radiator when in a closed position.

14. The wheel loader machine of claim 13, further comprising a frame mounted with respect to the first hood; wherein the first hinge operatively interconnects the second hood and the frame such that the second hood is selectively rotatable with respect to the frame; and wherein said at least part of a second hinge is operatively connected to the frame such that the frame is selectively rotatable with the first and second hoods about the second axis;
each of the first and second hoods is characterized by a U-shaped cross section; and
the second hood includes a radiator grill.

15. The wheel loader machine of claim 14, further comprising at least one load assist mechanism operatively connected to the second hood to selectively urge the second hood to rotate about the first axis; and
wherein the second hood is selectively rotatable about the first axis between the closed position with respect to the first hood, an open position with respect to the first hood, and a predetermined bias neutral position that is between the open and closed positions; and wherein said at least one load assist mechanism is sufficiently positioned with respect to the second hood to bias the second hood toward the closed position when the second hood is between the closed position and the bias neutral position, and to bias the second hood toward the open position when the second hood is between the bias neutral position and the open position.

16. The wheel loader machine of claim 15, further comprising an actuator operatively coupled to said at least part of a second hinge.

\* \* \* \* \*